United States Patent [19]

Bonet et al.

[11] Patent Number: 5,317,522
[45] Date of Patent: May 31, 1994

[54] METHOD AND APPARATUS FOR NOISE BURST DETECTION IN A SIGNAL PROCESSOR

[75] Inventors: Luis A. Bonet; Carlos A. Greaves; Jose G. Corleto, all of Austin, Tex.

[73] Assignee: Motorola, Inc., Schaumburg, Ill.

[21] Appl. No.: 88,944

[22] Filed: Jul. 12, 1993

Related U.S. Application Data

[63] Continuation-in-part of Ser. No. 821,111, Jan. 15, 1992.

[51] Int. Cl.⁵ .......................................... H04B 14/06
[52] U.S. Cl. ...................................... 364/514; 375/76; 375/104; 375/27; 375/34; 364/517
[58] Field of Search ............... 375/76, 104, 27, 34; 341/143; 364/517

[56] References Cited

U.S. PATENT DOCUMENTS 4,684,989  8/1987  Roeder et al. ............... 358/167
5,161,185  11/1992  Hochschild .................. 379/416

OTHER PUBLICATIONS

Nakamura, et al.; "Improved ADPCM Voice Transmission for TDMA-TDD Systems"; IEEE Proceedings of Vehicular Technology Conf. '93; pp. 301-304 (May 18-20, 1993).

Peter Dent; "CT2 Error rate detection within the ADPCM algorithm"; IEEE Colloquium on Speech Coding-Techniques and Applications in London, UK; pp. 211-215 (1992).

Primary Examiner—Jack B. Harvey
Assistant Examiner—Kamini S. Shah
Attorney, Agent, or Firm—Paul J. Polansky

[57] ABSTRACT

A signal processor such as an ADPCM decoder (128b) receives an input signal. As part of the CCITT Recommendation G.726 algorithm, an inverse adaptive quantizer (41) processes the input signal to provide a quantized difference signal $d_q(k)$. When enabled, a noise detector (50) samples signal $d_q(k)$ once for each of a predetermined number of received samples. The noise detector (50) adds the absolute value of signal $d_q(k)$ to a total energy estimate. At the end of the predetermined number of samples, the noise detector (50) compares the total energy estimate to a product of a noise threshold and the predetermined number. If the total energy estimate exceeds this product, then a noise indication is provided. In another embodiment (228b) a noise detector (250) compares an existing energy estimate signal $d_{ml}(k)$ computed by an adaptation speed control block (48) as part of the G.726 algorithm to an energy threshold to save processing time.

22 Claims, 8 Drawing Sheets

FIG.2 —PRIOR ART—

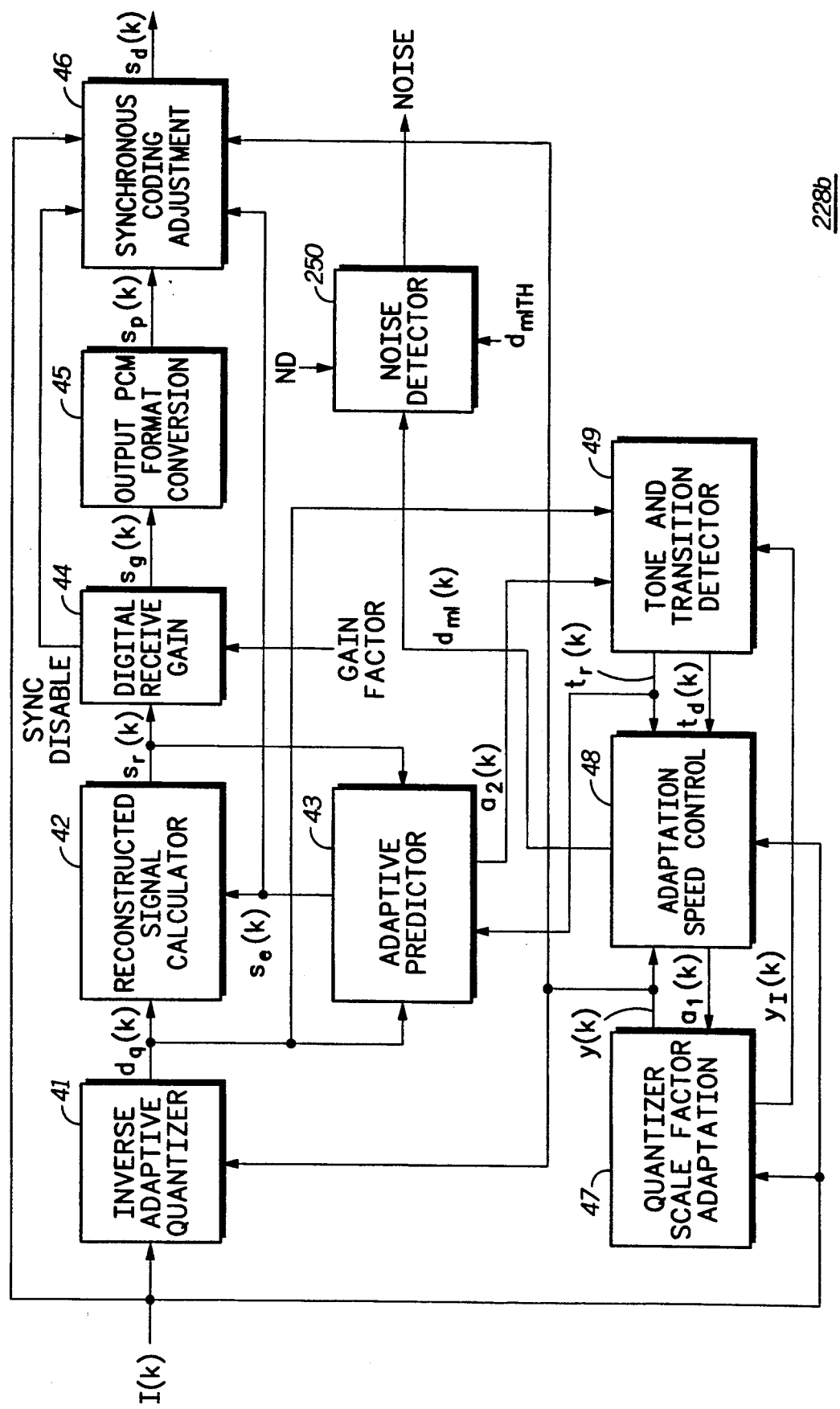

METHOD AND APPARATUS FOR NOISE BURST DETECTION IN A SIGNAL PROCESSOR

This application is a continuation-in-part of application Ser. No. 07/821,111, filed Jan. 15, 1992, by Jose G. Corleto, Luis A. Bonet, and David Yatim, and assigned to the assignee hereof, entitled "Method and Apparatus for Noise Burst Detection in a Signal Processor", pending.

CROSS REFERENCE TO RELATED, COPENDING APPLICATIONS

Related, copending application is application Ser. No. 07/822,033, filed Jan. 15, 1992, entitled "Broken Link Detect Using Audio Energy Level" by Gary S. Lobel and assigned to the assignee hereof, pending.

FIELD OF THE INVENTION

This invention relates generally to signal processors, and more particularly, to signal processors with noise burst detection and related methods.

BACKGROUND OF THE INVENTION

The increased density and reduced cost of integrated circuit components has made many previously impractical products commercially viable. One type of product made viable by advances in integrated circuit technology is the digital cordless telephone. A digital cordless telephone handset receives an analog speech signal via a microphone, converts the analog speech signal into a digital speech signal, compresses the digital speech signal, modulates the compressed signal at a radio frequency (RF), and transmits the modulated RF signal through an antenna. The transmitted RF signal is received by a nearby base station where it may be converted to an analog signal (or remain in digital form for digital switching equipment), and ultimately relayed to the destination telephone. When a similar signal is received from the destination telephone, the telephone signal undergoes the same process in reverse. The base station transmits a digital RF signal to the handset which is received via the antenna, demodulated, decompressed, and converted into an analog speech signal which drives a speaker in the handset.

One standard for the operation of a cordless telephone handset is the U.K. Cordless Telephone, Second Generation (CT-2) standard. A CT-2 handset receives an analog voice signal from a microphone. The voice signal is converted to digital pulse code modulation (PCM) format, processed through an adaptive differential pulse code modulation (ADPCM) encoder, and then modulated and transmitted according to the CT-2 Common Air Interface (CAI) protocol to a base station. CT-2 specifies CCITT G.721 ADPCM for the operation of the ADPCM encoder. Transmit and receive signals are sent and received to and from the base station in packets in a ping-pong fashion. CAI specifies that a part of the packet includes signalling information including such things as call setup and termination requests and handshaking information. For signal reception, a packet is received, demodulated, processed through a G.721 ADPCM decoder, converted from digital PCM to analog, and then provided to a speaker.

Both analog and digital functions are necessary in the operation of a digital cordless telephone handset. To perform the conversion from analog to PCM and from PCM to analog, a conventional integrated circuit such as the Motorola MC145554 μ-law PCM Codec-Filter or the Motorola MC145557 A-law PCM Codec-Filter may be used. To perform the conversion from PCM to ADPCM and from ADPCM to PCM, a conventional integrated circuit such as the Motorola MC145532 ADPCM Transcoder may be used. Both of these functions may also be combined into a single, mixed signal processing integrated circuit. To reduce cost, it is desirable to reduce the size of the integrated circuit while maintaining functionality.

In the CT-2 cordless telephone system, the handset establishes a digital link with the base station. The link is normally maintained until the call is completed. In some cases, the link may be lost or broken between the handset and the base station during the call. For example, if the user moves the handset outside of the range of the base station, then the link may be lost. The result is that a high level of white noise is provided to the speaker due to the randomness of the received data until the broken link is detected and the noise is muted. A noise level of about 3 to 6 decibels (dB) below the maximum level may occur. The only method specified by the CAI protocol to detect link loss is to detect the absence of an expected handshake message in the signalling part of the packet. Intervals in the transmission of handshake messages may be as long as several seconds. One way to lessen the detection time is to force periodic communication between the base station and the handset, which results in a reduction in detection time to several hundred milliseconds. Even then, a user may hear a loud noise when the link is broken.

SUMMARY OF THE INVENTION

Accordingly, the present invention provides, in one form, a method for noise burst detection in a signal processor. An input signal is continuously received, and the input signal is adaptively quantized to provide a quantized difference signal. An output signal of the signal processor is provided in response to the quantized difference signal. A noise indication is provided in response to at least one sample of the quantized difference signal exceeding a total energy estimate.

In another form, the present invention provides a signal processor with noise burst detection, comprising an inverse adaptive quantizer, noise detection means, and output means. The inverse adaptive quantizer provides a quantized difference signal $d_q(k)$ in response to an input signal $I(k)$ of the signal processor. The noise detection means is coupled to the inverse adaptive quantizer, and receives signal $d_q(k)$, a predetermined number, and a product of a noise threshold and the predetermined number, calculates a total energy estimate of signal $d_q(k)$ sampled once for each of said predetermined number of samples of a plurality of samples, and provides a noise indication in response to the total energy estimate exceeding the product of the noise threshold and the predetermined number. The inverse adaptive quantizer and the output means substantially forms a CCITT Recommendation G.726-1990 adaptive differential pulse code modulation (ADPCM) decoder for at least one data rate thereof.

In yet another form, the present invention provides a method for noise burst detection in an adaptive differential pulse code modulation (ADPCM) decoder substantially complying with CCITT Recommendation G.726-1990 for at least one data rate thereof. An input signal $I(k)$ is received at an input of the ADPCM decoder. A signal $d_{mf}(k)$ is formed by an adaptation speed control block of the ADPCM decoder. The signal $d_{ml}(k)$ is compared to a predetermined energy threshold. A noise indication is provided if the signal $d_{ml}(k)$ exceeds the predetermined energy threshold.

In still another form, the present invention provides a signal processor with noise burst detection, comprising adaptive pulse code modulation (ADPCM) signal processing means and noise detection means. The ADPCM signal processing means receives an input signal I(k) and provides an output signal $s_d(k)$. The ADPCM signal processing means includes an adaptation speed control block having an output for providing an output signal $d_{ml}(k)$. The noise detection means is coupled to the adaptation speed control block, and receives the signal $d_{ml}(k)$ and a predetermined energy threshold, compares the signal $d_{ml}(k)$ to the predetermined energy threshold, and provides a noise indication in response to the signal $d_{ml}(k)$ exceeding the predetermined energy threshold. The ADPCM signal processing means substantially forms a CCITT Recommendation G.726-1990 ADPCM decoder for at least one data rate thereof.

These and other features and advantages will be more clearly understood from the following detailed description taken in conjunction with the accompanying drawings.

BRIEF DESCRIPTION OF THE DRAWINGS

FIG. 8 illustrates in block form a functional block diagram of a second embodiment of the ADPCM decoder of FIG. 1 in accordance with the present invention.

DETAILED DESCRIPTION OF A PREFERRED EMBODIMENT

Figure 1:
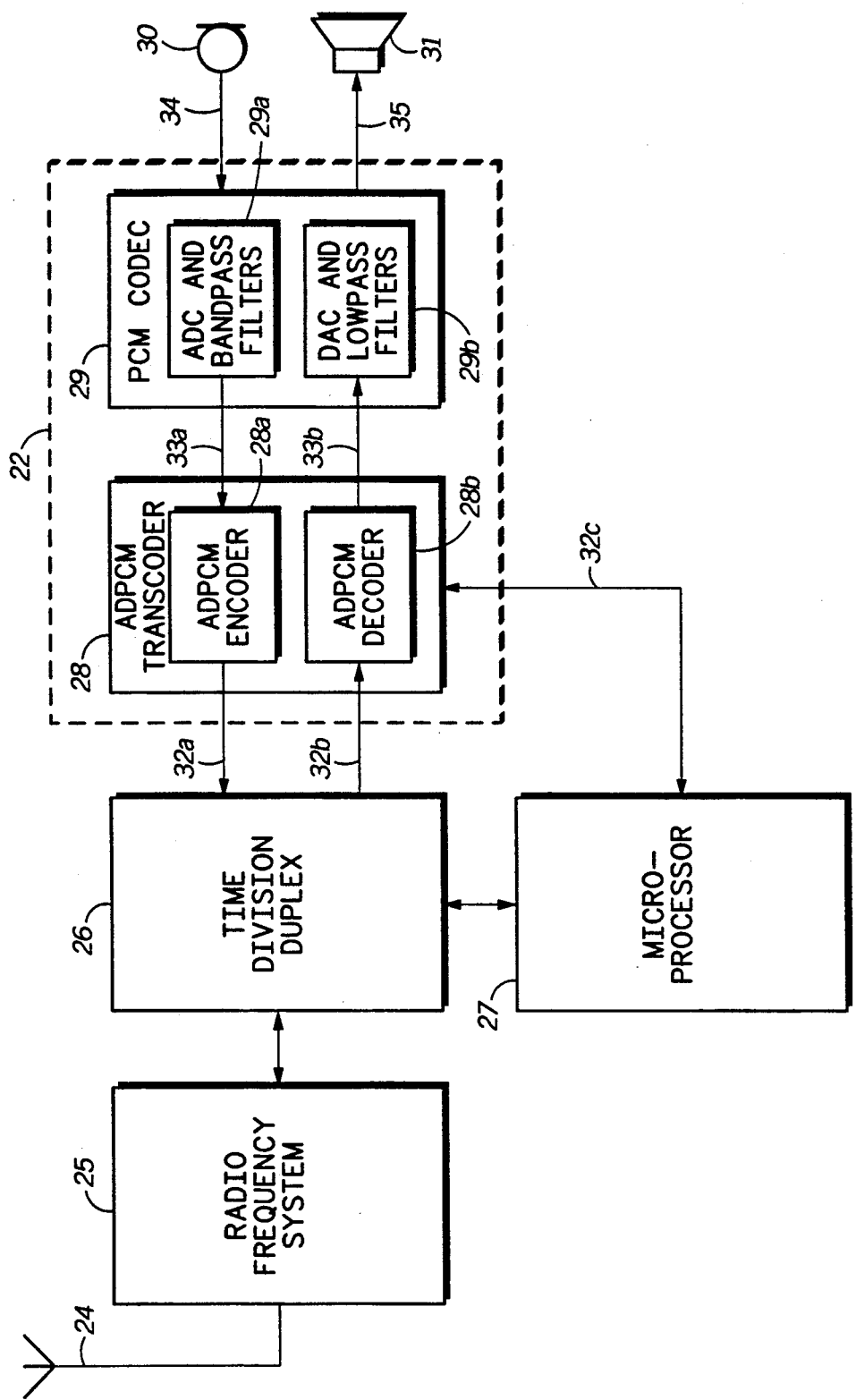
FIG. 1 illustrates in block diagram form a telephone handset including an ADPCM CODEC.

FIG. 1 illustrates in block diagram form a CT-2 telephone handset 20 including an ADPCM CODEC 22. Handset 20 conforms to the CT-2 standard. According to the CT-2 protocol, telephone signals are received and transmitted digitally in packets in a half-duplex or ping-pong scheme between handset 20 and a base station (not shown in FIG. 1). An antenna 24 is used for transmitting and receiving radio-frequency (RF) representations of telephonic signals. An RF system 25 is connected to antenna 24 for receiving and demodulating, and modulating and transmitting, digital streams of telephonic data. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signalling bits.

A microphone 30 provides an analog telephone signal via input signal lines 34 to ADPCM CODEC 22. In the illustrated embodiment, ADPCM CODEC 22 is a single integrated circuit incorporating both an ADPCM transcoder 28 and a PCM codec 29. PCM codec 29 performs the function of a conventional integrated circuit, such as the Motorola MC145554 $\mu$-law PCM Codec-Filter or the Motorola MC145557 A-law PCM Codec-Filter. Functionally, PCM codec 29 includes two portions, an analog-to-digital converter (ADC) and bandpass filters 29a, and a digital-to-analog converter (DAC) and low-pass filters 29b. ADC and bandpass filters 29a converts the analog telephone signal to a digital telephone signal and converts it to PCM according to the A-law or $\mu$-law algorithm, and provides the digital telephone signal to ADPCM transcoder 28 via input signals 33a. Functionally, ADPCM transcoder 28 includes two portions, an ADPCM encoder 28a, and an ADPCM decoder 28b. ADPCM encoder 28a in turn compresses the 64 kbps digital telephone signal to a 32 kbps ADPCM signal according to the G.721 standard and provides the ADPCM signal to time division duplex block 26 via a signal line 32a. Time division duplex block 26 then combines signalling bits from microprocessor 27 with the compressed digital data from ADPCM transcoder 28 to form a CT-2 packet. Time division duplex block 26 provides the CT-2 packet to radio frequency system 25, which modulates it and provides it as an RF signal to antenna 24, where it is radiated and eventually received by the base station. The modulation scheme is a two-level FSK shaped by an approximately Gaussian filter, as described in the CT-2 CAI Specification.

For reception, a packet from the base station is received as a modulated RF signal on antenna 24. Radio frequency system 25 receives the RF signal and demodulates it. The packet is then presented to a time division duplex block 26. Time division duplex block 26 splits the packet into its two constituent components, making signalling bits available to microprocessor 27. Time division duplex block 26 makes the compressed digital signal available to an ADPCM transcoder 28 via signals 32b. Subsequently, microprocessor 27 reads the signalling bits and performs associated signalling functions, such as call setup and disconnect.

ADPCM decoder 28b decompresses the compressed digital signal received from time division duplex block 26. In the illustrated embodiment, as part of a CT-2 handset, ADPCM decoder 28b conforms to CCITT Recommendation G.721. ADPCM decoder 28b converts the 32 kbps ADPCM digital signal to 64 kbps PCM according to standard G.721 ADPCM. ADPCM transcoder 28 is connected via input and output signals 32c to microprocessor 27, which initializes and controls the operation thereof. DAC and lowpass filters 29b receives the PCM data via input signals 33b, performs A-law or $\mu$-law decompression and digital-to-analog conversion to form an analog telephone signal, and provides the analog telephone signal to a speaker 31 and a ringer (not shown in FIG. 1) via output signals 35.

Whenever the link is broken, random noise with a high energy level is inserted into the signal. Thus, one possibility for detecting a broken link is to compare the average energy level of the received signal to a threshold. If the average energy level over a predetermined period exceeds the threshold, then it is possible to conclude that the link has been broken and to mute the output to speaker 31. A method and apparatus to detect a broken link in this manner is disclosed in U.S. patent application Ser. No. 07/822,033, filed Jan. 15, 1992, entitled "Broken Link Detect Using Audio Energy Level" by Gary S. Lobel and assigned to the assignee hereof, which is herein incorporated by reference.

To calculate average power with this method, microprocessor 27 must sample the received digital PCM data conducted on signal 33b, designated "$s_d(k)$", which will be further explained below. For some systems, however, this calculation is impractical. First, PCM is a logarithmic format; to calculate power, the data must be converted to a linear format. Second, in implementations in which ADPCM transcoder 28 and PCM codec 29 are included in a single integrated circuit (such as mixed signal processing system 22), signal 33b is not available externally without dedicating additional device pins (for data, clock, and enable signals). Third, some applications, such as the CT-2 handset itself, are extremely cost-sensitive; to minimize cost, microprocessor 27 may have reduced performance and may not have enough computational power to perform the power calculation.

Figure 2:
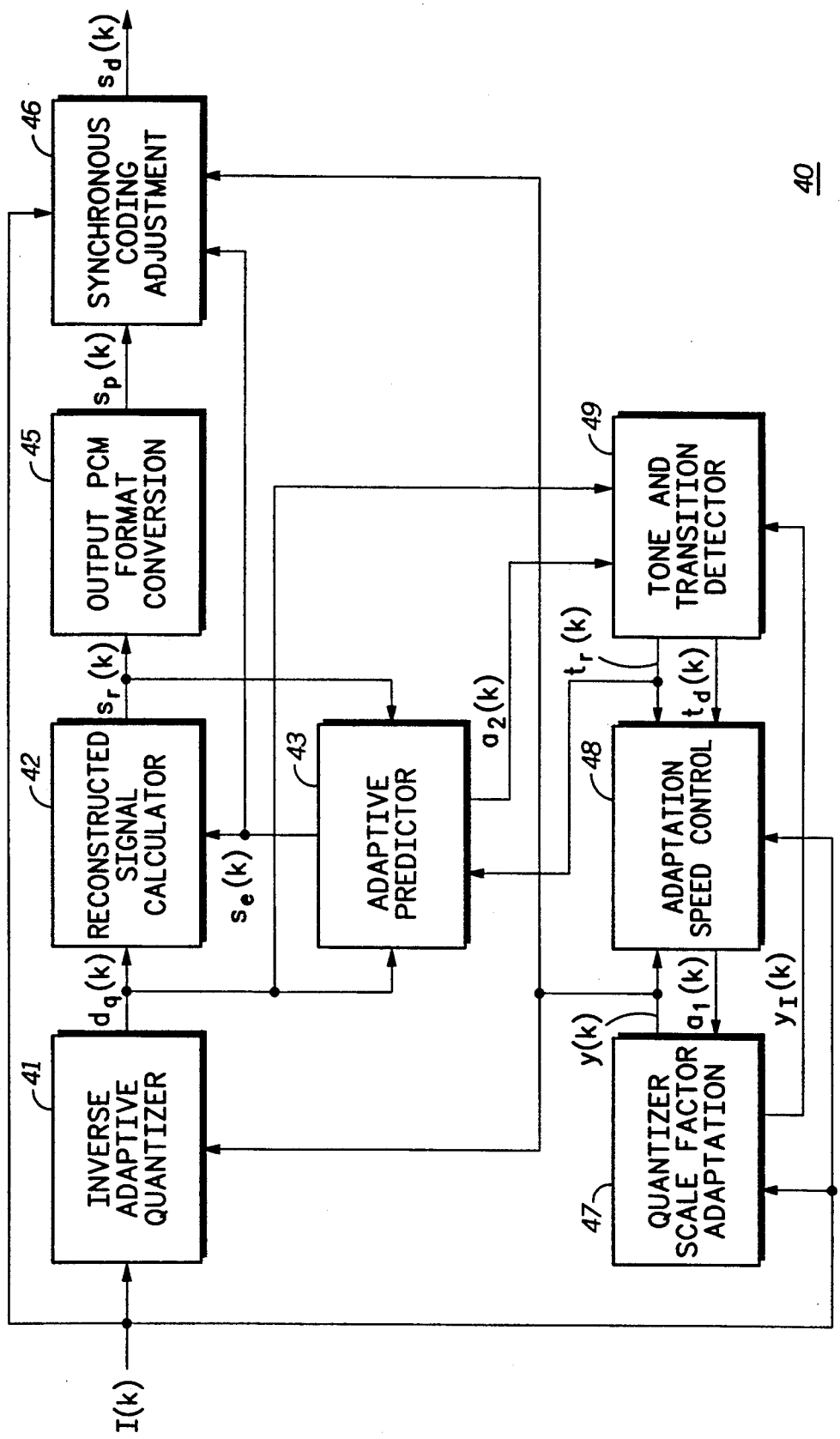
FIG. 2 illustrates in block form a functional block diagram of a prior art ADPCM decoder conforming to CCITT Recommendation G.721 or G.726.

FIG. 2 illustrates in block form a functional block diagram of a prior art ADPCM decoder 40 conforming to CCITT Recommendation G.721 or G.726. ADPCM decoder 40 includes an inverse adaptive quantizer 41, a reconstructed signal calculator 42, an adaptive predictor 43, an output PCM format conversion 45, a synchronous coding adjustment 46, a quantizer scale factor adaptation 47, an adaptation speed control block 48, and a tone and transition detector 49. The operation of each of these functional blocks is well-known and is described in CCITT Recommendation G.726-1990.

Figure 3:
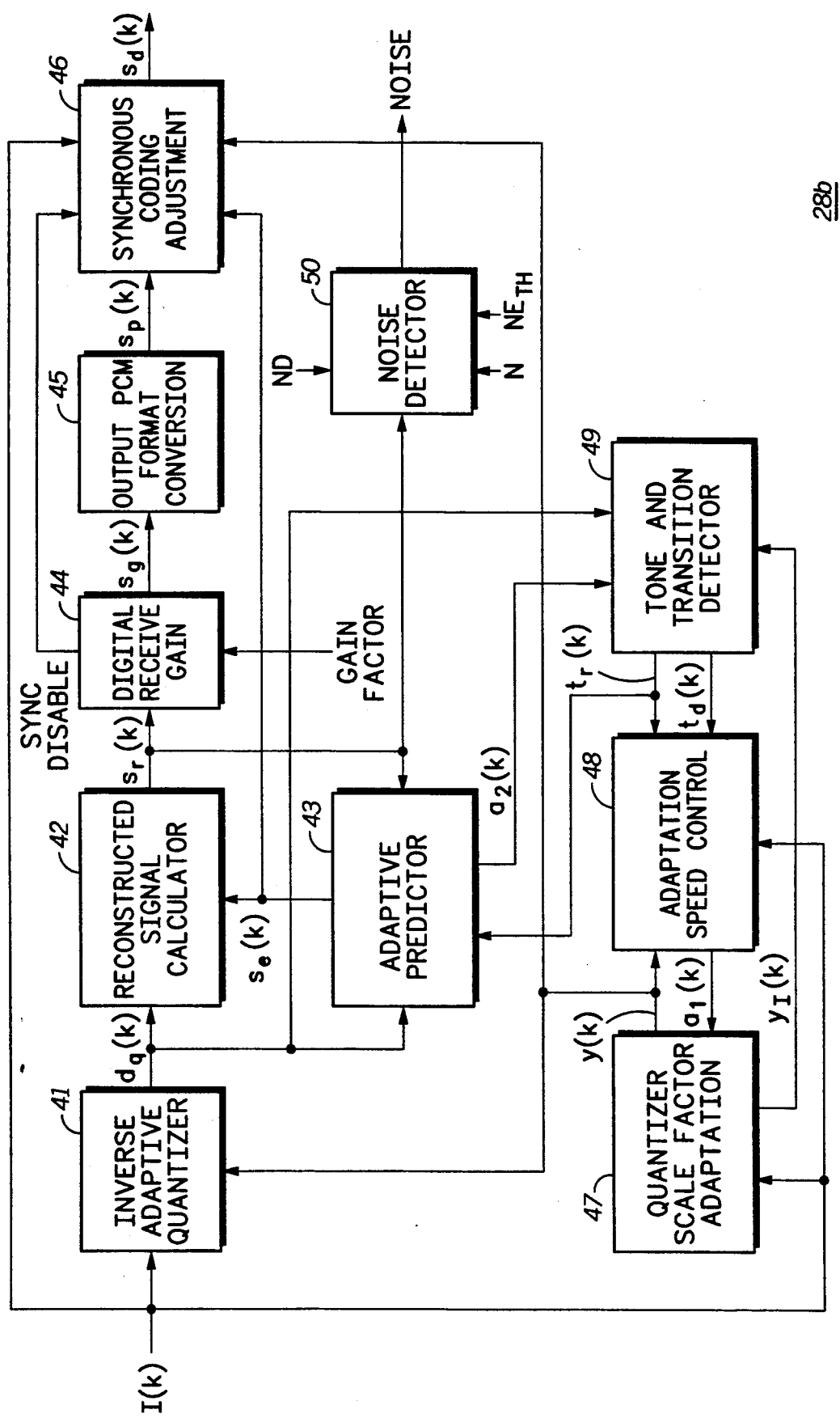
FIG. 3 illustrates in block form a functional block diagram of one embodiment of the ADPCM decoder of FIG. 1.

FIG. 3 illustrates in block form a functional block diagram of one embodiment 28b of the ADPCM decoder of FIG. 1. ADPCM decoder 28b includes a digital receive gain 44 and a noise detector 50. While preferred for ADPCM decoder 28b, other embodiments may omit digital receive gain 44. All other blocks perform similarly to corresponding blocks of the ADPCM decoder specified in G.721 or G.726 and shown in FIG. 2. Digital receive gain 44 receives the reconstructed signal $s_r(k)$ and a variable GAIN FACTOR. In response, digital receive gain 44 provides a reconstructed signal with gain labelled "$s_g(k)$", and a signal labelled SYNC DISABLE to synchronous coding adjustment 46. Thus, digital receive gain 44 allows a linear gain adjustment. The operation of digital receive gain 44 is described in application Ser. No. 07/810,755, entitled "ADPCM Decoder with an Integral Digital Receive Gain and Method Therefor", filed Dec. 17, 1991, by Jose Corleto, Luis Bonet, and David Yatim, and assigned to the assignee hereof, which is herein incorporated by reference.

Noise detector 50 receives the reconstructed signal $s_r(k)$ and three parameters: a number of samples which will be included in the energy computation labelled "N", an energy threshold value labelled "$NE_{TH}$", and a noise detection enable labelled "ND". Microprocessor 27 provides parameters N, $NE_{TH}$, and ND to ADPCM transcoder 28 via a conventional serial communications port (SCP) of ADPCM transcoder 28 (not shown in FIG. 3). Noise detector 50 provides a noise indication labelled "NOISE" in response to the average energy of $s_r(k)$, labelled "$E_{AVE}$", exceeding a predetermined threshold, labelled "$E_{TH}$". One way of performing this energy calculation is to approximate $E_{AVE}$ by adding the absolute value of signal $s_r(k)$ over N sample periods, and then divide the result by N, which is expressed as:

$$E_{AVE}=(1/N)(\Sigma|s_r(k)|) \qquad [1]$$

where "$\Sigma$" represents the summation operator, and where the summing interval is from (k=0) to (k=N−1). However, this calculation is cumbersome for some DSPs. An application-specific DSP includes a reduced number of instructions to optimize the operation for real-time signal processing applications. A divide instruction is not required for G.721 ADPCM. Thus, in order to minimize the number of instructions, it is desirable to eliminate the need for a divide instruction in the average power calculation.

Average power calculation without a divide instruction can be done if the total energy, instead of the average energy, is computed. Noise detector 50 solves this problem by activating NOISE if the energy over N samples, labelled "$NE_{AVE}$", exceeds $NE_{TH}$. This formula is expressed mathematically as:

$$\text{IF } [(NE_{AVE}=\Sigma|s_r(k)|)\geq NE_{TH}] \text{ THEN}$$
$$(\text{NOISE}=1) \text{ ELSE } (\text{NOISE}=0) \qquad [2]$$

where, as before, the summing interval is from (k=0) to (k=N−1). Since the number of samples N and an average energy threshold may be determined in advance, their product $NE_{TH}$ is known. Microprocessor 27 of FIG. 1 provides $NE_{TH}$ to noise detector 50, which performs the average energy estimation of equation 2 and provides NOISE accordingly. In response to the activation of NOISE, microprocessor 27 attenuates or mutes the received signal. The muting may occur in ADPCM decoder 28, PCM codec 29, or directly to signal 35 provided to speaker 31. In the preferred embodiment, digital receive gain 44 allows microprocessor 27 to mute the received signal digitally by setting GAIN FACTOR to zero.

Figure 4:
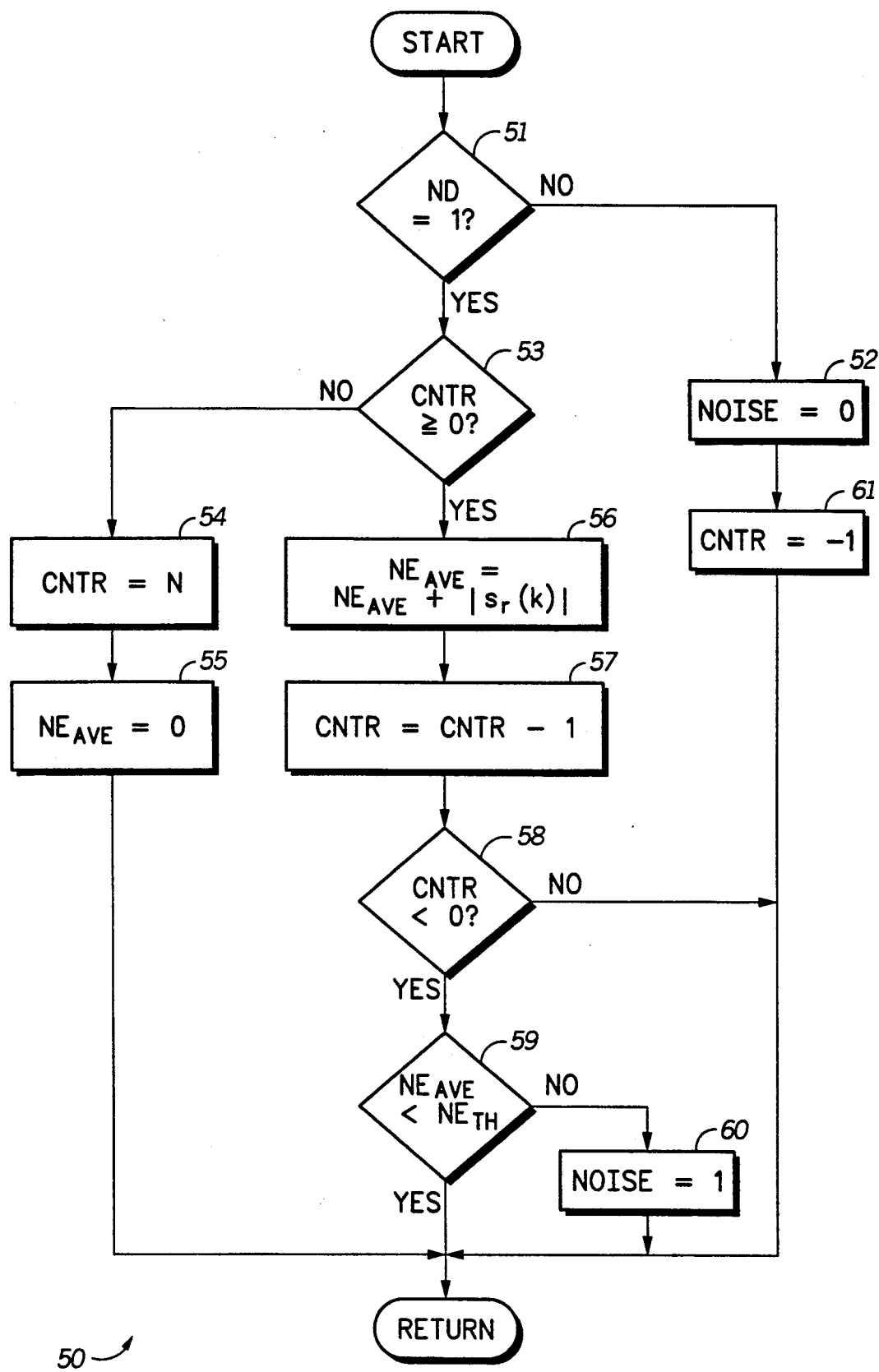
FIG. 4 illustrates a flow chart in accordance with and illustrating the method of the noise detector of FIG. 3.

FIG. 4 illustrates a flow chart in accordance with and illustrating the method of noise detector 50 of FIG. 3, and is assigned the same reference number. ADPCM decoder 28b starts execution of the noise detection routine by checking, at step 51, whether a noise detection control bit, labelled "ND", is set. If ND is not set, then noise detector 50 is disabled and program flow is returned to a main routine after NOISE is cleared at step 52 and CNTR is set to negative 1 at step 61. If ND is set, then a counter variable labelled "CNTR" is checked at step 53. CNTR is an internal variable that keeps track of how many values of $|s_r(k)|$ remain to be accumulated. CNTR is set to negative 1 upon power-up and reset of ADPCM codec 22. If ND=1 (enabled), and CNTR is negative, then CNTR is initialized to N, the number of samples of $|s_r(k)|$ that will be used in the energy calculation, at step 54. Internal variable $NE_{AVE}$, which represents the total energy estimate over N samples, is initialized to zero at step 55.

On the following sample, a positive value of CNTR is detected at step 53. $|s_r(k)|$ is added to the value of $NE_{AVE}$ at step 56, and CNTR is decremented at step 57. CNTR is again tested at step 58 to determine if it is negative. Steps 56, 57, and 58 are repeated for each sample until CNTR is decremented to −1. When CNTR is decremented to −1, $NE_{AVE}$ represents an estimate of the total energy for the time interval defined by the sample interval times N. For G.721 32 kbps ADPCM, the sample interval is 125 microseconds (μsec), and thus $NE_{AVE}$ represents an estimate of the total energy in the signal over an (N)*(125 μsec) interval. $NE_{AVE}$ is compared to $NE_{TH}$ at step 59. If $NE_{AVE}$ is not less than $NE_{TH}$, then NOISE is set at step 60.

Different ways of implementing the algorithm are also possible. The flow chart of FIG. 4 illustrates a decrementing sample counter. It is also possible to initialize an incrementing sample counter to zero and then to compare the value of $NE_{AVE}$ to $NE_{TH}$ when the counter reaches N. Also, NOISE was set in response to a false result of a test whether $NE_{AVE}$ is less than $NE_{TH}$ at step 59. In another embodiment, NOISE could be set in response to a true result of a test of whether $NE_{AVE}$ is greater than $NE_{TH}$.

Figure 5:
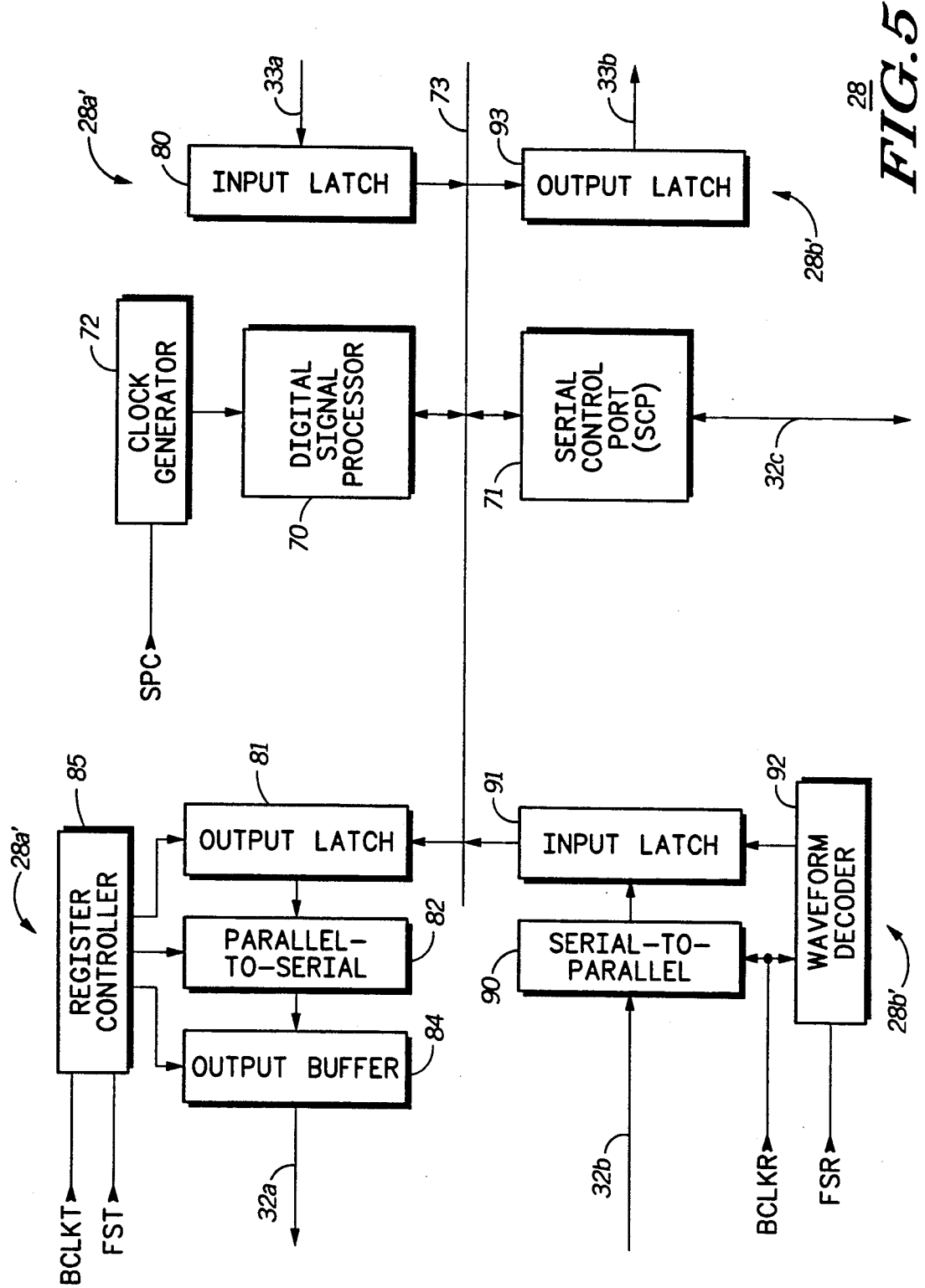
FIG. 5 illustrates in block form the ADPCM transcoder of FIG. 1 in accordance with a preferred embodiment of the present invention.

FIG. 5 illustrates in block form ADPCM transcoder 28 of FIG. 1 in accordance with a preferred embodiment of the present invention. It should be noted that FIG. 5 depicts ADPCM transcoder 28 according to functional blocks representative of hardware circuitry. By contrast, FIG. 3 illustrates a functional block diagram of ADPCM decoder 28b. FIG. 5 clarifies how the blocks of ADPCM transcoder 28 perform the functions illustrated by FIG. 3. In FIG. 5, blocks which correspond to the encoder function are referred to as 28a', and blocks which correspond to the decoder function are labelled 28b', with the remaining blocks performing parts of both functions.

ADPCM transcoder 28 includes a digital signal processor (DSP) 70. DSP 70 is coupled to a communications bus 73 for receiving data therefrom and providing data thereto. A clock generator 72 receives a signal labelled "SPC" which is the output of a crystal oscillator (not shown). Clock generator 72 is coupled to DSP 70 and provides a clock signal thereto. A serial control port (SCP) 71 is also connected to communications bus 73. SCP 71 is connected to microprocessor 27 of FIG. 1 via signal lines 32c. SCP 71 allows microprocessor 27 to initialize and control the operation of ADPCM transcoder 28. SCP 71 includes registers which store ND, N, $NE_{TH}$, and GAIN FACTOR from microprocessor 27, and NOISE from ADPCM decoder 28b.

ADPCM encoder 28a' includes an input latch 80, an output latch 81, a parallel-to-serial block 82, an output buffer 84, and a register controller 85. Input latch 80 is connected to PCM codec 29 of FIG. 1 via input signal lines 33a. Input latch 80 latches digital PCM data words from PCM codec 29 and provides the data to DSP 70 via communications bus 73. DSP 70 performs the function of a G.721 ADPCM encoder through microcode. DSP 70 also provides ADPCM data words via communications bus 73 to output latch 81. The ADPCM data word may be either 8, 4, 3, or 2 bits corresponding to a data rate of either 64, 32, 24, or 16 kbps, respectively. In the CT-2 handset, however, a data word of 4 bits corresponding to the G.721 32 kbps data rate is used. Parallel-to-serial block 82 is connected to output latch 81 and provides an ADPCM data word serially to output buffer 84, which provides the data to time division duplex block 26 of FIG. 1 via signal line 32a. Register controller 85 is connected to, and controls the operation of, output latch 81, parallel-to-serial block 82, and output buffer 84 in response to a clock input signal labelled "BCLKT" and a control signal labelled "EST".

ADPCM decoder 28b includes a serial-to-parallel block 90, an input latch 91, a waveform decoder 92, and an output latch 93. Serial-to-parallel block 90 receives an ADPCM-encoded stream of data bits via input signal line 32b, combines the data into ADPCM data words, and provides the data words to input latch 91. Input latch 91 stores an ADPCM data word and makes it available to DSP 70. Waveform decoder 92 receives input signals labelled "FSR" and "BCLKR". Signal BCLKR clocks the received data, and signal FSR determines the operating mode. Together, signals BCLKR and FSR determine operation at a data rate of either 64, 32, 24, or 16 kbps. In the CT-2 handset, however, a data word of 4 bits corresponding to the G.721 32 kbps data rate is used. DSP 70 performs the function of a G.721 ADPCM decoder having the digital receive gain and noise detection functions illustrated in FIG. 3 in microcode. DSP 70 provides digital PCM signal $s_d(k)$ to output latch 93, which subsequently provides it to PCM codec 29 via signal line 33b.

ADPCM transcoder 28 performs the functions of a G.721 ADPCM encoder and a G.721 ADPCM decoder. In FIG. 5, several blocks of integrated circuit hardware assist DSP 70 in performing each function. Microcode running on DSP 70 actually performs the functional block diagram of FIG. 3, and thus DSP 70 is common to both the ADPCM encoder and decoder functions. In an alternate embodiment, some or all of the functional blocks of FIG. 3 may be performed by hardware circuitry. However, because of the efficiency with which DSP 70 implements noise detector 50 and digital receive gain 44, by using spare clock cycles that are not needed to perform the other encoder and decoder functions, microcode implementation is preferred. For the same reasons, muting the received audio signal by providing (GAIN FACTOR=0) to digital receive gain 44 after noise detector 50 activates NOISE is also preferred.

Figure 6:
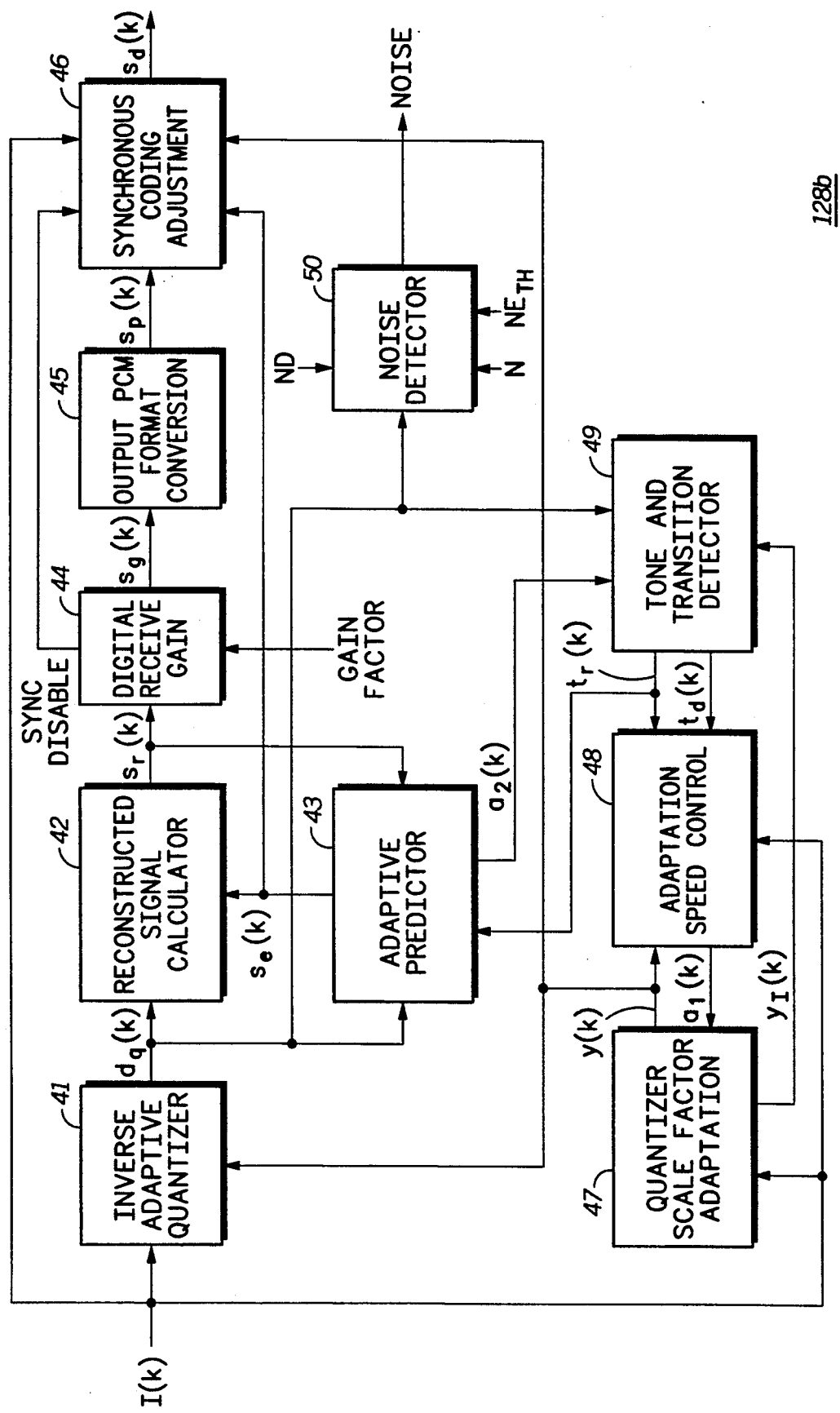
FIG. 6 illustrates in block form a functional block diagram of one embodiment of the ADPCM decoder of FIG. 1 in accordance with the present invention.

FIG. 6 illustrates in block form a functional block diagram of a second embodiment 128b of ADPCM decoder 28b of FIG. 1 in accordance with the present invention. All other elements in common with FIG. 3 retain their previous reference numbers. ADPCM decoder 128b is similar to ADPCM decoder 28b of FIG. 3 except that noise detector 50 receives signal $d_q(k)$ from inverse adaptive quantizer 41 as an input signal rather than signal $s_r(k)$.

Figure 7:
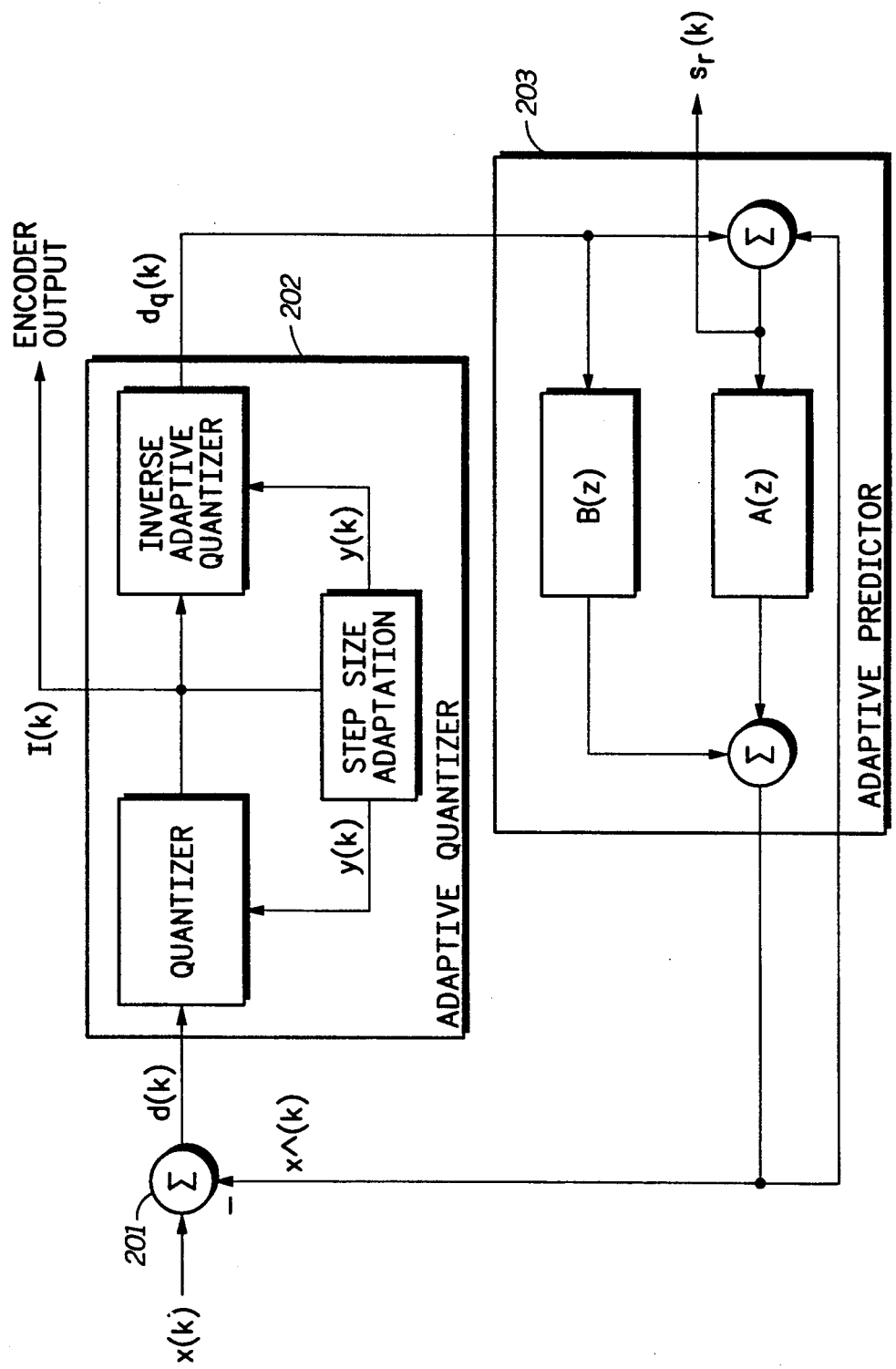
FIG. 7 illustrates a simplified block diagram of an ADPCM encoder useful in understanding the present invention.

By using signal $d_q(k)$ instead of signal $s_r(k)$, ADPCM decoder 128b is able to discriminate better between segments of speech and noise burst. This improvement is better understood with reference to FIG. 7, which illustrates a simplified block diagram of an ADPCM encoder 200 useful in understanding the present invention.

ADPCM encoder 200 includes generally a summing device 201, an adaptive quantizer 202, and an adaptive predictor 203. Adaptive predictor 203 generates an input signal estimate labelled "x(k)", which summing device 201 subtracts from an original signal labelled "x(k)" to provide a difference signal labelled "d(k)". Adaptive quantizer 202 than scales signal d(k) prior to quantization and generates a variable-width codeword signal I(k). Signal I(k) is the ADPCM word that forms an input to the decoder at the remote end. As explained earlier, the decoder takes signal I(k) and performs an inverse quantization to generate the quantized difference signal $d_q(k)$. This value is then summed with the input signal estimate x(k) to generate reconstructed signal $s_r(k)$. Under normal circumstances, the decoder tracks the encoder. That is, the value of signal $d_q(k)$ computed at the decoder is the same as the value of signal $d_q(k)$ computed at the encoder, since both versions of signal $d_q(k)$ are inverse adaptively quantized from the same signal I(k). Thus signal $d_q(k)$ at the decoder has the same low variance as signal $d_q(k)$ at the encoder. Likewise, signal $s_r(k)$ at the decoder tracks signal $s_r(k)$ at the encoder under normal circumstances. The only difference between signal $s_r(k)$ and original input signal x(k) is an error component introduced during the quantization process.

Mathematically, signal-to-noise ratio (S/N) is a typical figure of merit for measuring the performance of the predictor. S/N equals the ratio of the variance of the original input signal, designated $\sigma_x^2$ divided by the variance of the quantization error $\sigma_e^2$ (where $\sigma_e^2$ is the variance of the quantization error signal $e(k)=d_q(k)-d(k)$), or $$S/N = \sigma_x^2/\sigma_e^2 \qquad [3]$$

S/N can also be expressed as the product of the predictor gain $G_p$ and the signal-to-quantizing noise ratio $S/N_q$. In order to increase S/N the ADPCM encoder tries to minimize the variance $\sigma_d^2$ of difference signal d(k), which in turn minimizes the variance of the quantized difference signal $d_q(k)$:

$$S/N = G_p \cdot S/Nq = (\sigma_x^2/\sigma_d^2) \cdot (\sigma_d^2/\sigma_e^2) = \sigma_x^2/\sigma_e^2 \qquad [4]$$

where $\sigma_x^2/\sigma_d^2$ is a measure of the performance of adaptive predictor 203, and $\sigma_d^2/\sigma_e^2$ is a measure of the performance of adaptive quantizer 202.

When the decoder is tracking the encoder, i.e. the link is robust, the variance of $d_q(k)$ is much smaller than the variance of $s_r(k)$. However, when the link has been lost the random values of signal I(k) cause an increase in the variance of signal $d_q(k)$ such that it is almost equal to the variance of $s_r(k)$. By using $d_q(k)$ instead of $s_r(k)$, noise detector 50 is more immune from false triggers during normal operation. Furthermore, since the energy in $d_q(k)$ is low during periods of normal operation, the integration period may be reduced while maintaining a given immunity to false triggers. A reduction in the integration period also results in a need for fewer bits to store $NE_{AVE}$. For example, noise detector 50 requires an integration period of around 40 milliseconds to maintain a margin of 10% between speech and noisy energy segments, while noise detector 50 requires only 5 milliseconds to maintain the same margin. Also, quicker detection times makes the pops in the listener's ear more subtle.

FIG. 8 illustrates in block form a functional block diagram of a third embodiment 228b of ADPCM decoder 28b of FIG. 1 in accordance with the present invention. ADPCM decoder 228b is similar to ADPCM decoder 28b of FIG. 3 except that ADPCM decoder 228b includes a noise detector 250 which is different from noise detector 50 of ADPCM decoder 28b. All other elements are the same and retain their previous reference numbers. Noise detector 250 receives an energy threshold labelled "$d_{mITH}$" and provides NOISE as an output, and receives signal $d_m(k)$ from adaptation speed control block 48 as an input signal rather than signal $s_r(k)$ or $d_q(k)$. Signal $d_m(k)$ is a long term average of signal I(k) and is recursively computed according to the G.721 or G.726 standard using the following formula:

$$d_m(k) = (1-2^{-7}) \cdot d_m(k) + 2^{-7} \cdot F[I(k)] \qquad [3]$$

where F[I(k)] is related to the quantized encoder output signal I(k) by the relation shown in TABLE I:

TABLE I

| |I(k)| | F[I(k)] |
| --- | --- |
| 0 | 0 |
| 1 | 0 |
| 2 | 0 |
| 3 | 1 |
| 4 | 1 |
| 5 | 1 |
| 6 | 3 |
| 7 | 7 |

Because parameter $d_q(k)$ is the result of the inverse quantization of the magnitude of parameter I(k), the computation of $d_m(k)$ is another approximation of the energy in $d_q(k)$, with the exception that the energy is computed continuously over time. Thus, ADPCM decoder 228b takes advantage of an already-existing estimate to detect noise. The result is that ADPCM decoder 228b provides better noise discrimination than ADPCM decoder 28b of FIG. 3, but not as good as that of ADPCM decoder 128b. However, ADPCM decoder 228b requires no additional computations and thus requires less circuit area. Instead of implementing the flow chart of FIG. 4, noise detector 250 only compares signal $d_m(k)$ to signal $d_{mITH}$ when enabled by signal ND. If signal $d_m(k)$ exceeds signal $d_{mITH}$, noise detector 250 activates signal NOISE. In addition, a digital signal processor requires fewer instructions to implement the function of ADPCM decoder 228b, and noise detection is virtually instantaneous because adaptation speed control block 48 has already computed signal $d_m(k)$.

While the invention has been described in the context of a preferred embodiment, it will be apparent to those skilled in the art that the present invention may be modified in numerous ways and may assume many embodiments other than that specifically set out and described above. For example, a signal processor may use any reconstructed version of a difference signal which is the difference between an input signal and an estimate of the input signal on which to perform noise burst detection. While in the context of G.726 ADPCM noise detector 128b performs noise detection on signal $d_q(k)$, a noise detector will use corresponding signals for other encoding schemes. Accordingly, it is intended by the appended claims to cover all modifications of the invention which fall within the true spirit and scope of the invention.

We claim:

1. A method for noise burst detection in a signal processor comprising the steps of:
   continuously receiving an input signal;
   adaptively quantizing said input signal to provide a quantized difference signal;
   providing an output signal of the signal processor in response to said quantized difference signal; and
   providing a noise indication in response to at least one sample of said quantized difference signal exceeding a total energy estimate.

2. The method of claim 1 further comprising the step of performing said steps of continuously receiving, adaptively quantizing, providing said output signal, and providing said noise indication with a digital signal processor.

3. The method of claim 1 wherein said step of providing said noise indication comprises the steps of:

initializing said total energy estimate to zero;
adding an absolute value of said quantized difference signal to said total energy estimate a predetermined number of times; and
providing said noise indication if said total energy estimate exceeds a predetermined threshold.

4. The method of claim 3 further comprising the step of providing said noise indication if said total energy estimate exceeds a product of said predetermined number and an energy threshold.

5. The method of claim 1 wherein said step of providing said noise indication comprises the steps of:
initializing a counter to a predetermined value;
initializing said total energy estimate to zero;
adding an absolute value of said quantized difference signal to said total energy estimate;
decrementing said counter;
repeating said steps of adding and decrementing until said counter is less than zero; and
providing said noise indication if said total energy estimate exceeds a predetermined threshold.

6. The method of claim 5 wherein said step of repeating further comprises the step of repeating said steps of adding, decrementing, and providing said noise indication once for each of a plurality of samples received by the signal processor while said counter is greater than or equal to zero.

7. The method of claim 5 wherein said step of adding further comprises the step of adding an absolute value of a difference signal $d_q(k)$ of an ADPCM decoder substantially complying with CCITT Recommendation G.726 for at least one data rate thereof, to said total energy estimate.

8. The method of claim 5 further comprising the step of performing said steps of initializing said counter, initializing said noise signal, adding, decrementing, repeating, and providing, in response to a noise detection control signal.

9. The method of claim 1 wherein said step of providing said noise indication comprises the steps of:
setting a counter to a predetermined number and a total energy estimate to zero in response to said counter being less than zero;
adding an absolute value of said quantized difference signal to said total energy estimate;
decrementing said counter;
providing a noise indication if said total energy estimate exceeds a product of a predetermined threshold and said predetermined number, in response to said counter being less than zero; and
repeating said steps of setting, adding, decrementing, and providing for each of a plurality of values of said quantized difference signal.

10. The method of claim 9 wherein said step of repeating further comprises the step of repeating said steps of setting, adding, decrementing, and providing for each of a plurality of samples of said quantized difference signal, said plurality of samples of said quantized difference signal greater than or equal to said predetermined number.

11. The method of claim 9 further comprising the steps of:
clearing a noise indication and initializing said counter to a negative value in response to a noise detection control signal being cleared; and
performing said steps of setting, adding, decrementing, and providing while a noise detection control signal is set.

12. In an adaptive differential pulse code modulation (ADPCM) decoder substantially complying with CCITT Recommendation G.726-1990 for at least one data rate thereof, a method for noise burst detection comprising the steps of:
receiving an input signal I(k) at an input of the ADPCM decoder;
forming a signal $d_{ml}(k)$ in an adaptation speed control block of the ADPCM decoder;
comparing said signal $d_{ml}(k)$ to a predetermined energy threshold; and
providing a noise indication if said signal $d_{ml}(k)$ exceeds said predetermined energy threshold.

13. The method of claim 12 further comprising the step of performing said steps of forming, providing, and comparing with a digital signal processor.

14. The method of claim 12 wherein said step of providing further comprises the step of providing a noise indication if said signal $d_{ml}(k)$ exceeds said predetermined energy threshold when a noise detection enable signal is activated.

15. A signal processor with noise burst detection, comprising:
an inverse adaptive quantizer for providing a quantized difference signal $d_q(k)$ in response to an input signal I(k) of the signal processor;
noise detection means coupled to said inverse adaptive quantizer, for receiving said signal $d_q(k)$, a predetermined number, and a product of a noise threshold and said predetermined number, for calculating a total energy estimate of said signal $d_q(k)$ sampled once for each of said predetermined number of samples of a plurality of samples, and for providing a noise indication in response to said total energy estimate exceeding said product of said noise threshold and said predetermined number; and
output means coupled to said inverse adaptive quantizer, for providing an output signal of the signal processor $s_d(k)$ in response to said quantized difference signal $d_q(k)$;
said inverse adaptive quantizer and said output means substantially forming a CCITT Recommendation G.726-1990 adaptive differential pulse code modulation (ADPCM) decoder for at least one data rate thereof.

16. The signal processor of claim 15 wherein said output means comprises an integral digital receive gain for receiving a signal $s_r(k)$ and a gain factor, for multiplying said signal $s_r(k)$ by said gain factor to provide a reconstructed signal with gain $s_g(k)$, and for substituting said signal $s_g(k)$ for said signal $s_r(k)$ in said output means when said gain factor is not equal to unity gain.

17. The signal processor of claim 16 further comprising means for providing said noise indication to a microprocessor and for receiving said gain factor from said microprocessor.

18. The signal processor of claim 15 wherein said noise detection means further receives a noise detection enable signal, and provides said noise indication in response to said total energy estimate exceeding said product of said noise threshold and said predetermined number when said noise detection enable signal is active.

19. A signal processor with noise burst detection, comprising:
adaptive pulse code modulation (ADPCM) signal processing means for receiving an input signal I(k) and for providing an output signal $s_d(k)$;

said ADPCM signal processing means including an adaptation speed control block having an output for providing an output signal $d_{mi}(k)$; and noise detection means coupled to said adaptation speed control block, for receiving said signal $d_{mi}(k)$ and a predetermined energy threshold, for comparing said signal $d_{mi}(k)$ to said predetermined energy threshold, and for providing a noise indication in response to said signal $d_{mi}(k)$ exceeding said predetermined energy threshold; said ADPCM signal processing means substantially forming a CCITT Recommendation G.726-1990 ADPCM decoder for at least one data rate thereof.

20. The signal processor of claim 18 wherein ADPCM signal processing means further comprises an integral digital receive gain for receiving a signal $s_r(k)$ and a gain factor, for multiplying said signal $s_r(k)$ by said gain factor to provide a reconstructed signal with gain $s_g(k)$, and for substituting said signal $s_g(k)$ for said signal $s_r(k)$ when said gain factor is not equal to unity gain.

21. The signal processor of claim 18 further comprising means for providing said noise indication to a microprocessor and for receiving said gain factor from said microprocessor.

22. The signal processor of claim 18 wherein said noise detection means further receives a noise detection enable signal, and provides said noise indication in response to said signal $d_{mi}(k)$ exceeding said predetermined energy threshold when said noise detection enable signal is active.

* * * * *

UNITED STATES PATENT AND TRADEMARK OFFICE
CERTIFICATE OF CORRECTION

PATENT NO. : 5,317,522
DATED : May 31, 1994
INVENTOR(S) : Luis A. Bonet, et al.

It is certified that error appears in the above-indentified patent and that said Letters Patent is hereby corrected as shown below:

Column 13, line 14, change "18" to —19—.

Column 13, line 15, before "ADPCM" insert —said—.

Column 14, line 6, change "18" to —20—.

Column 14, line 10, change "18" to —19—.

Signed and Sealed this

Fifteenth Day of November, 1994

Attest:

BRUCE LEHMAN

*Attesting Officer*    *Commissioner of Patents and Trademarks*